United States Patent [19]
Cielaszyk et al.

[11] 3,737,746
[45] June 5, 1973

[54] QUARTZ CRYSTAL CONTROLLED STEPPER MOTOR

[75] Inventors: Edward F. Cielaszyk; Robert S. Lundin; Frank W. Stellwagen, Mesa, Ariz.

[73] Assignee: General Time Corporation, Thomaston, Conn.

[22] Filed: Apr. 19, 1972

[21] Appl. No.: 245,592

[52] U.S. Cl..................318/130, 58/23 AC, 310/37, 318/137
[51] Int. Cl.............................................H02k 33/16
[58] Field of Search......................................
310/36–39, 49, 162–169; 318/119–134; 58/23, 23 TF, 23 H, 23 HC, 23 D, 23 V, 28 A, 28 B, 24; 328/48, 55, 58

[56] References Cited

UNITED STATES PATENTS

| | | | |
|---|---|---|---|
| 3,163,808 | 12/1964 | Peterson, Jr............................318/130 |
| 3,238,431 | 3/1966 | Raval....................................318/130 |
| 3,363,410 | 1/1968 | Imahashi...........................58/23 AC |
| 3,393,366 | 7/1968 | Shoop....................................328/48 |
| 3,435,311 | 3/1969 | Matsuzawa et al.................310/37 X |
| 3,541,778 | 11/1970 | Ingenito et al.......................58/23 R |
| 3,555,810 | 1/1971 | Meitinger..............................58/23 R |
| 3,626,686 | 12/1971 | Harris....................................58/23 R |
| 3,629,710 | 12/1971 | Durland................................328/48 |
| 3,641,761 | 2/1971 | Reese....................................58/28 B |
| 3,664,118 | 5/1972 | Walton..................................58/23 A |

Primary Examiner—D. F. Duggan
Attorney—Dean S. Edmonds, Willis H. Taylor, Jr., James W. Laist et al.

[57] ABSTRACT

A battery powered self-starting stepper motor driven by pulses of alternating polarity derived from a quartz crystal oscillator via a divider circuit. The output of the quartz crystal oscillator is connected to a divider circuit which divides the high frequency output of the oscillator down to 1 Hz. The complementary outputs of the last divider stage are coupled to a pair of bistable circuits and the output of an intermediate divider stage is connected to the reset terminals of the bistable circuits to limit the pulse width or duty cycle of the pulses generated by each bistable circuit. The respective outputs of the bistable circuits are coupled to the energizing winding on the stator core of the stepper motor via a drive circuit such that the pulses from one of the bistable circuits are passed through the winding in a first direction and the pulses from the other bistable are passed through the winding in the opposite direction.

6 Claims, 12 Drawing Figures

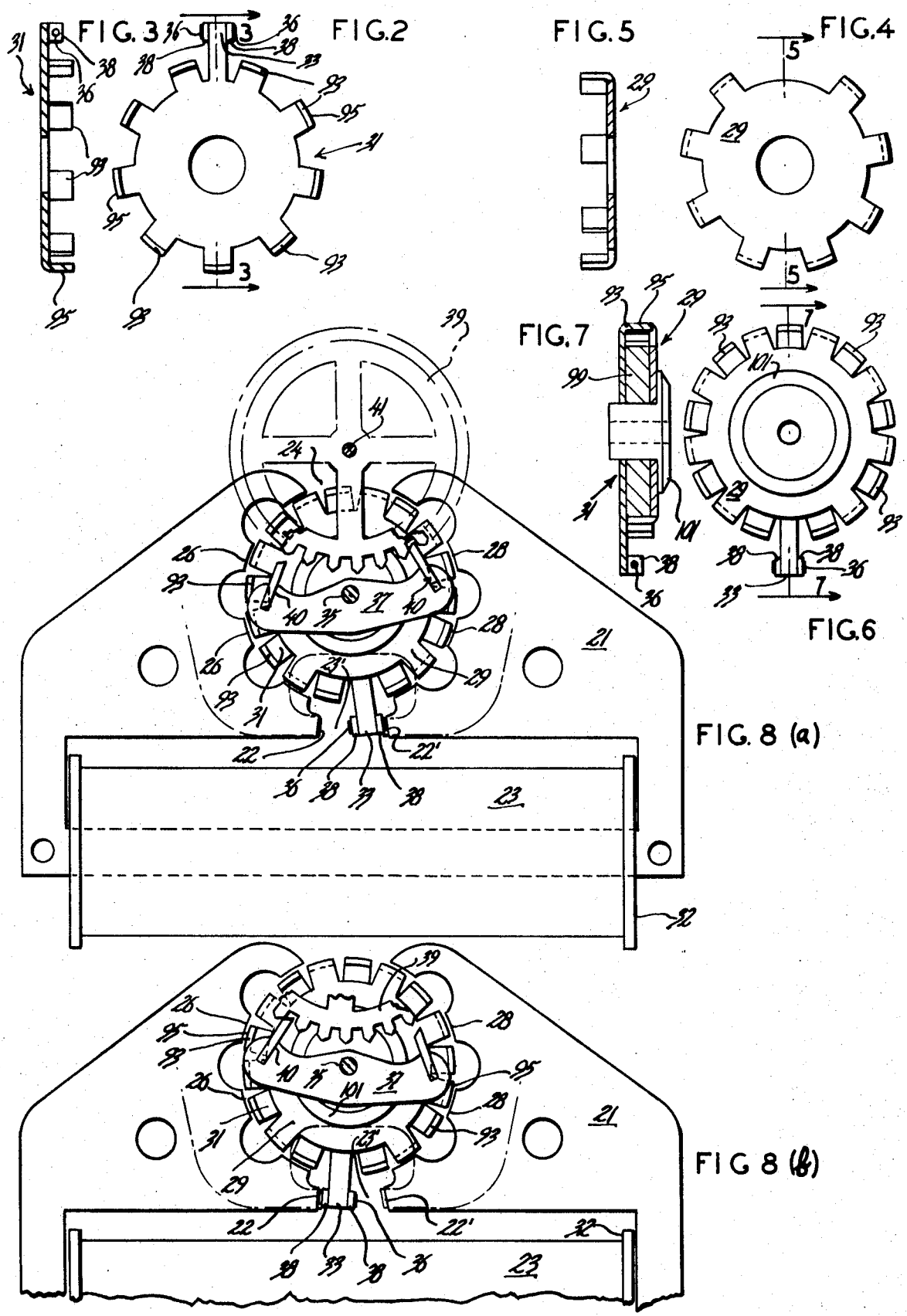

3,737,746

QUARTZ CRYSTAL CONTROLLED STEPPER MOTOR

BACKGROUND OF THE INVENTION

This invention relates to an oscillator controlled stepper motor. More specifically, this invention relates to a battery powered, highly efficient stepper motor driven by a quartz crystal oscillator via a divider circuit in a watch assembly.

In the past, electrically powered watches included a tuning fork oscillator in combination with a transistor circuit and magnetic induction coils for generating an oscillating mechanical movement which powered the drive train of the watch via a pallet and escapement wheel mechanism.

More recently quartz crystal oscillators have been adapted for driving the gear train of watches and other time pieces. However, particular difficulties have been encountered in adapting such quartz crystal oscillators to watch movements because the small confines of watch cases did not permit the use of large batteries required for continuously powering watches for long periods of time. Thus, for example, quartz crystal oscillators have typically been utilized to drive unidirectional rotary timer motors which continuously dissipated energy from the battery. Such continuous dissipation of battery energy through the motor resulted in an inefficient utilization of battery energy and therefore caused dissipation of battery energy after a relatively short utilization period.

It is, therefore, an object of this invention to provide a crystal controlled stepper motor having a high-efficiency with low-power dissipation.

SHORT STATEMENT OF THE INVENTION

Accordingly, this invention relates to a battery powered, self-starting stepper motor including a stator having a core and an energizing winding wherein the core is separated to form an air gap. The periphery of the core about the air gap is notched to form a plurality of stator pole pairs. The motor also includes a rotor having a pair of rotor discs which are separated by a permanent magnet. Each rotor disc has a plurality of teeth about the periphery thereof with one of the discs having an elongated locking tooth which extends into a channel portion of the air gap for limiting the rotation of the rotor in either direction with respect to the stator.

The energizing signal which drives the motor is generated by a quartz crystal oscillator, the output of which is divided down to 1 Hz by a divider circuit. The complementary outputs of the last divider stage of the divider circuit are connected to a pair of bistable circuits. The output of an intermediate divider stage is connected to the reset terminals of the bistable circuits to limit the pulse width or duty cycle of the pulses generated by the bistable circuits. The outputs of the bistable circuits are connected to the stator energizing winding via a drive circuit which couples the pulses generated by the two bistable circuits to opposite ends of the energizing winding. Accordingly, a pulse form of alternating polarity is passed through the winding which thereby induces an alternating flux in the rotor. The alternating flux drives the rotor to oscillate in a to and fro manner.

BRIEF DESCRIPTION OF THE DRAWINGS

Other objects, features, and advantages of this invention will become more fully apparent from the following detailed description, appended claims and the accompanying drawings in which:

FIG. 2 is a plan view of the bottom rotor disc showing the locking tooth;

FIG. 3 is a section view of the rotor disc taken along the lines 3—3 of FIG. 2;

FIG. 4 is a plan view of the upper rotor disc;

FIG. 5 is a section view of the upper rotor disc taken along the lines 5—5 of FIG. 4;

FIG. 6 is a plan view of the composite rotor assembly;

FIG. 7 is a section view of the composite rotor assembly taken along the lines 7—7 of FIG. 6;

FIG. 8 (a) is a plan view of the stepper motor of this invention showing the rotor in a first counter-clockwise position;

FIG. 8 (b) is a partial view of the stepper motor of this invention showing the rotor in a second clockwise position;

DETAILED DESCRIPTION OF THE PREFERRED EMBODIMENT

Figure 1:
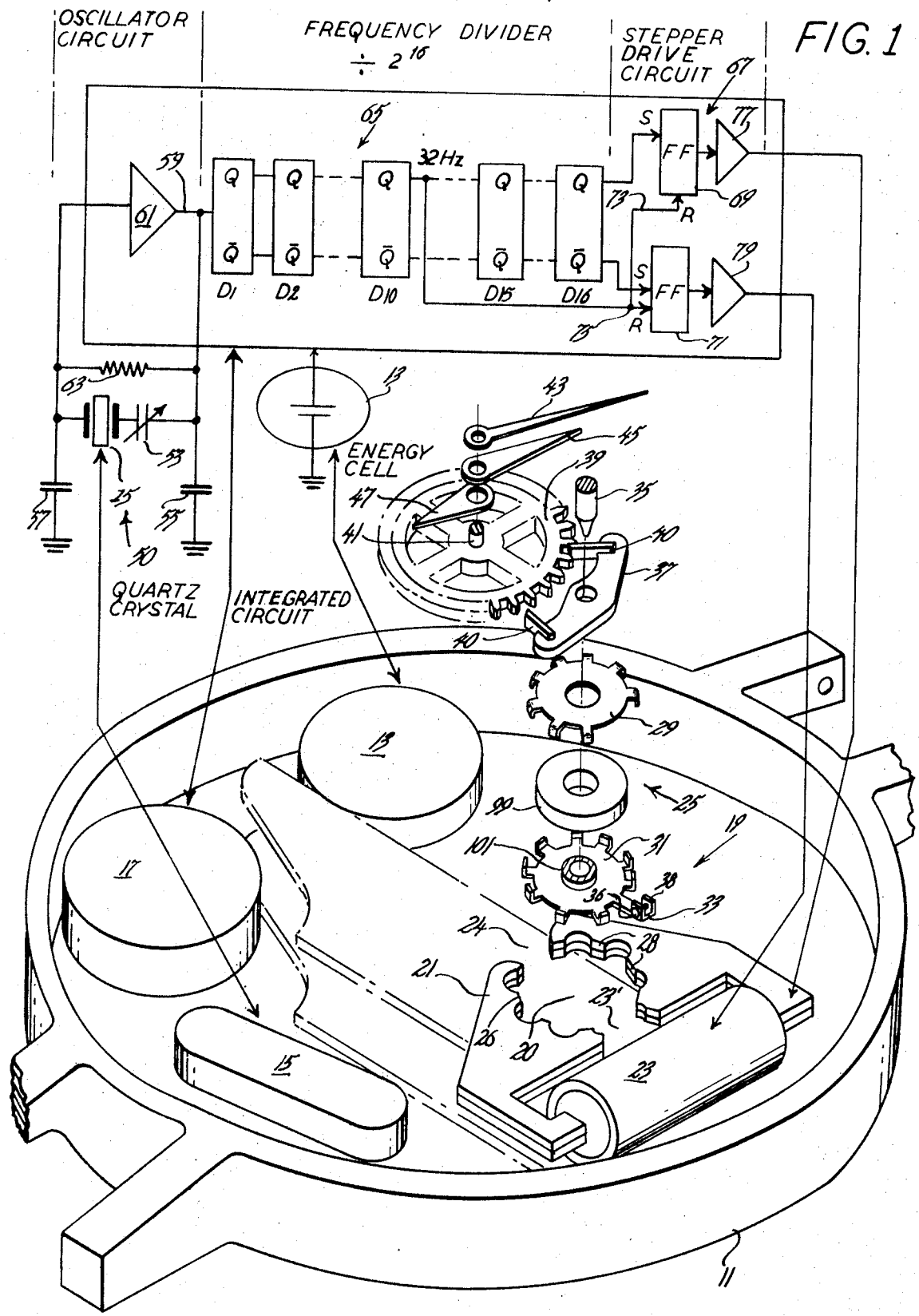
FIG. 1 is a schematic illustration of the stepper motor and energizing circuit therefor including an exploded view of the rotor and the watch drive train assemblies.

Refer now to FIG. 1 where there is shown a simplified schematic view of a watch utilizing the stepper motor and drive circuitry of this invention. A watch case 11 is shown having bevels at opposite ends thereof to which straps may be attached for securing the watch to an arm. Mounted in the case is a battery 13 which preferably is a 1.5 volt silver oxide cell, such as, for example, an Eveready type EPX-77 battery. It should be understood, however, that the cell may be of any suitable type having a small size with a relatively large energy capacity and which is readily available commercially. Also positioned in the watch case is a quartz crystal 15 which may be of any suitable, commercially available type. The quartz crystal utilized in the preferred embodiment generates a signal having a 32,768 Hz frequency. The circuitry for converting the high frequency output of the quartz crystal to a 1 Hz pulse signal having a low duty cycle is shown packaged in element 17. The schematic block diagram of this circuit is shown in the upper portion of the drawings and will be described in detail hereinbelow.

The stepper motor 19 is shown having a stator core 21 with an energizing winding 23 about a leg portion thereof. The ends of the stator core 21 are separated to define a generally circular air gap 20 having channel portions 23 and 24 opposite one another between the stator ends. The periphery of the stator core about the circular portion of the air gap is notched to form a plurality of teeth therein which act as magnetic poles when the core winding is energized. A rotor 25, shown exploded, is positioned in the air gap 20. The rotor has top and bottom discs 29 and 31, respectively, with a permanent 99 interposed therebetween. Each of the discs 29 and 31 have a plurality of teeth spaced about the periphery thereof with disc 31 having one elongated tooth 33 which when the rotor is in position in the air gap extends into the channel portion 23 of the air gap. The tooth 33 restricts the rotary movement of the rotor to a predetermined limit. It should be understood that while only one such tooth is shown another elongated tooth could be appropriately positioned to extend into channel 24.

The rotor is supported for oscillatory motion about its axis by spindle or axle 35 shown partially cut-away. The axle 35 is journaled at its respective ends for oscillatory rotation about its longitudinal axis. Fixidly secured to axle 35 is a pallet arm 37 having a pair of pallet jewels 40 secured thereto at each end thereof. The pallet jewels impart intermittent motion to an escapement or seconds wheel 39 by intermittantly striking the gear teeth of the escapement wheel 39 as the rotor oscillates about the axle 35. Escapement wheel 39 is supported for rotational movement by means of a spindle 41 shown in partial cut-away. The seconds, minute, and hour hands 43, 45, and 47, respectively, are shown schematically and it is understood that any known suitable drive gear arrangement may be utilized to translate the motion of the escapement wheel 39 to appropriately drive the minute and hour hands. The seconds hand 43, however, is driven directly by spindle 41 of the seconds wheel.

Shown in the upper portion of FIG. 1 is a schematic diagram of a quartz crystal oscillator 50, a divider circuit 65 and the stepper motor drive circuit 67 which controls the synchronous, to and fro, oscillations of the rotor. A quartz crystal 15 has one side thereof connected to a reference potential such as ground via a variable capacitor 53 and a fixed capacitor 55. The other side of the crystal is connected to ground via a second fixed capacitor 57. Capacitors 55 and 57 operate to control the amount of feedback derived from the output 59 of the operational amplifier 61. Variable capacitor 53 is adjustable to fine tune the frequency of the signal generated by the quartz crystal 15. A biasing resistor 63 is connected across the input and output terminals of the amplifier and initiates oscillations in oscillator circuit 50. The frequency of the output of the oscillator 50 formed by the aforementioned elements is controlled by the size of the quartz crystal but may be varied slightly by adjusting capacitor 53. In the preferred embodiment the frequency of the oscillator output is 32,768 Hz.

Figure 10:
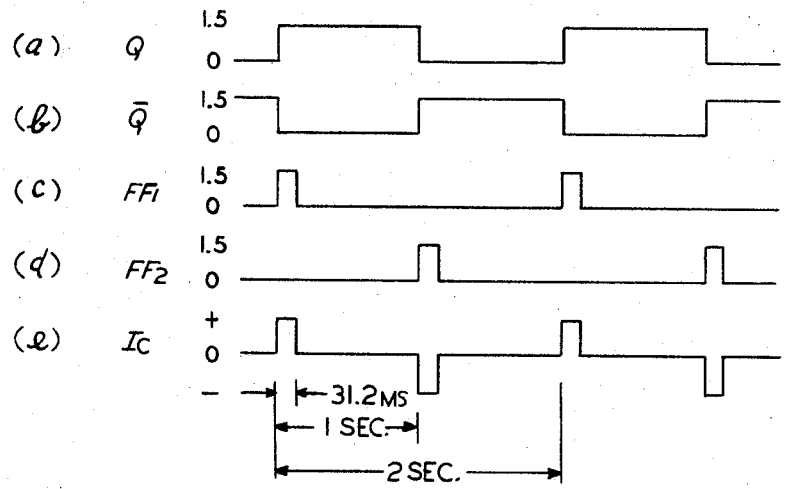
FIG. 10 is a graphical display of the waveforms generated by the circuit of FIG. 1.

In order to apply the high-frequency output of the quartz crystal oscillator circuit 50 to drive the stepper motor, the frequency of the oscillator output must be divided down to provide a 1 Hz energizing signal to the winding 23. Accordingly, frequency divider 65 is provided which includes a plurality of binary divider stages $D_1$ through $D_{16}$, with each stage dividing the frequency of the oscillator output by a factor of two. Thus, the output of divider stage $D_1$ is 16,384 Hz, the output of the second stage is 8,192 Hz and so on with the last stage $D_{16}$ providing an output having a frequency of 0.5 Hz. As shown divider stage 16 has two complementary outputs Q and $\overline{Q}$. The Q output is connected to the SET input of bistable circuit 69. The $\overline{Q}$ output of stage $D_{16}$ is connected to the SET input of bistable 71. When the Q output goes from ground potential to 1.5 volts which is the battery voltage, bistable 69 is set. The output of bistable 69 therefore goes from zero to 1.5 volts. One second later, as illustrated in FIG. 10, the $\overline{Q}$ output goes from ground potential to 1.5 volts while the Q output returns to ground potential. Thus, bistable 71 generates a step output of 1.5 volts.

In order to conserve battery energy the duty cycle or the pulse duration of the outputs of bistables 69 and 71 must be reduced. Accordingly, the Q output of the 10th divider stage, the frequency of which is 32 Hz is coupled to the Reset terminals 73 and 75 of bistables 69 and 71, respectively. Since the frequency of the output of the 10th stage is 32 Hz, the period of this pulse i.e., its duration, is approximately 31.22 milliseconds. Consequently, bistables 69 and 71 are reset 31.22 milliseconds after being set. It therefore can be seen that the outputs of bistables 69 and 71 are conducting current only during a very short time during each cycle. It should be understood that while the 32 Hz output derived from the 10th divider stage was utilized to reduce the duty cycle at the outputs of the bistables, the output of any of the divider stages could have been chosen provided, of course, that the pulse duration of the signals generated by the bistables is sufficient to power the stepper motor of this invention.

The outputs of bistables 69 and 71 are coupled to invertors 77 and 79 respectively, which circuits are connected to opposite ends of the stator winding 23.

Figure 11:
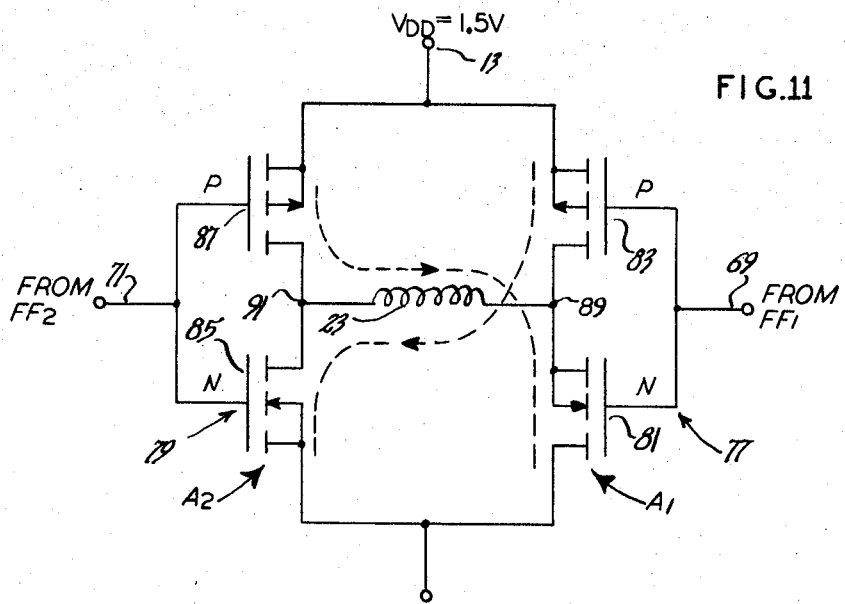
FIG. 11 is a schematic diagram of the energizing coil and drive circuit illustrated in FIG. 1.

Turn now to FIG. 11 which shows a more detailed schematic diagram of the invertor circuits 77 and 79. The output of bistables 69 is coupled to the input of invertor 77, and the output of bistable 71 is applied to the input of invertor 79. Invertor 77 includes an n-channel MOS transistor 81 and a p-channel MOS transistor 83. Invertor 79 similiarly has an n-channel transistor 85 and a p-channel transistor 87. The gate terminals of the transistors 81 and 83 are each connected to the output of bistable 69, and the gate terminals of transistors 85 and 87 are each connected to the output of bistable 71. The collector terminals of transistors 81 and 83 are each connected to one side of stator energizing winding 23 while the collector terminals of transistors 85 and 87 are each connected to the opposite side of winding 23. The emitter terminals of the p-channel transistors are connected to the 1.5 volt battery supply while the emitter terminals of the n-channel transistors are connected to ground.

In operation when the output of bistable 69 is zero volts, p-channel transistor 83 is conducting and the n-channel transistor 81 is cut off. Consequently, the voltage at coil terminal 89 is positive. When the output of bistable 69 is 1.5 volts, the n-channel transistor 81 conducts and the p-channel transistor 83 is cut off. The voltage at terminal 89 of coil 23 is then clamped to zero volts. Similarly, when the output of bistable 71 is at zero volts, the voltage at coil lead 91 is 1.5 volts, and when the output of bistable 71 goes to 1.5 volts, the voltage at lead 91 goes to zero volts. As a result the current waveform through the energizing coil 23 is as shown in FIG. 10(e). The alternating positive and negative pulses applied to the coil 23 induce alternating flux pulses in the core 21 of the stepper motor which causes the stepper rotor to oscillate back and forth with a to and fro motion. This oscillatory motion occurs at a frequency of one oscillation per second thereby causing pallet arm 37 with pallet jewels 40 thereon to step the seconds wheel at a rate of one step per second.

Referring to FIG. 10 there is shown a series of waveforms associated with the aforementioned circuitry for generating a signal for driving the stepper motor. FIG. 10 (a) shows the Q output of the last divider stage, $D_{16}$, and FIG. 10(b) shows the $\overline{Q}$ output of divider stage $D_{16}$. As shown the outputs are square waves having a frequency of 0.5 Hz with the $\overline{Q}$ output being phase displaced 180° with respect to the Q output. FIG. 10(c) shows the output of bistable 69 which is of the same frequency and polarity as the Q output of divider stage $D_{16}$ but which has a substantially reduced time duration or duty cycle. The reduced pulse width is due to the bistable being reset by the output of divider stage $D_{10}$. FIG. 10(d) illustrates the corresponding output of bistable 71 which as can be seen is time shifted by 1 second with respect to the output of bistable 69. As aforementioned FIG. 10(e) illustrates the resulting pulse waveform in the winding 23. The time duration of the pulse is only 31.2 milliseconds while the interval between pulses is 1 second.

For a more detailed discussion of the structure of the stepper motor refer now to FIGS. 2–7. Shown in FIG. 2 is the lower rotor disc 31 having a plurality of teeth 93 spaced about the periphery thereof with each of the teeth being separated by a 40° angle. As shown in FIG. 3 which is a section view of FIG. 2 taken along the lines 3—3 thereof, each tooth is bent upward at a 90° angle to form a pole face portion 95. A locking tooth or tab 33 extends radially outward from the rotor and bisects the 40° angle between two of the rotor teeth. As shown in FIG. 3 the sides of the tooth 33 proximate the end thereof are bent upward to form a pair surfaces 38 which act as pole faces electromagnetically. In the preferred embodiment a non-magnetic pin 36, 0.003 inches thick, is secured to each of the surfaces 38 of the locking tooth 33 in order to control the level of the residual magnetic holding force as the respective sides of the tooth make contact with the ends of the stator core 21 which define the channel 23. As an alternate embodiment, the sides 38 may be coated with a non-magnetic coating such as chrome-plate or hot tin dip in order to control the level of the residual magnetic holding force. The coating is preferably 0.003 inches thick. It should be understood, however, that the invention is not limited to the aforementioned non-magnetic material nor the aforementioned coating thickness.

Refer now to FIG. 4 which shows the upper rotor disc 29 which also includes a plurality of teeth about the periphery thereof with each tooth being separated from its neighboring tooth by a 40° angle. As shown in FIG. 5 which is a section view taken along the lines 5—5 of FIG. 4, each rotor tooth has its outer extremity bent downward at a 90° angle to form a pole face portion for interacting with the magnetic field of the stator core. The portion of the disc 29 which is positioned over the locking tooth 33 of the lower rotor disc does not have a corresponding tooth as shown in FIG. 4. In addition each tooth of disc 31 is positioned such that its pole portion extends between the pole portions of rotor disc 31.

Refer now to FIGS. 6 and 7 which show the composite rotor assembly. As shown the upper disc 29 and lower disc 31 are positioned opposite one another with their respective teeth meshing or interleaved. The discs are separated by a permanent magnet 99 and are secured thereto by a suitable epoxy bond. In the preferred embodiment epoxy under the tradename Bond Master M-645 which includes 30 parts of hardener to 100 parts resin cured under pressure at a temperature of 300° F. has been found to provide a satisfactory bond. The permanent magnet is preferably a barium ferrite material such as is available under the tradename Plastiform which is relatively inexpensive in the sizes required for the rotor of this invention. The diameter of the permanent magnetic is approximately the same as that of the rotor discs at the base of the rotor teeth. For ease of manufacture the permanent magnet 99 is magnetized after the rotor is assembled in such a manner that rotor disc 29 becomes a north pole and rotor disc 31 becomes a south pole. The magnetizing energy is controlled so that the open circuit leakage between rotor disc 29 and 31 is approximately 40 gauss. A bushing 101 is shown positioned through a hole in the center of the rotor and is secured to the rotor by the aforementioned epoxy bond. As shown in FIG. 1, the rotor and bushing are supported for rotational movement about the axis of the rotor by means of a spindle 35.

FIGS. 8(a) and 8(b) illustrate the stepper motor of this invention with the rotor shown positioned at the respective opposite extremes of its rotation. Referring first to FIG. 8(a) there is shown the stator core 21 having the winding 23 about one leg thereof. In the preferred embodiment the stator core includes two laminated ferromagnetic plates sandwiched together and having the leg portion thereof passing through the center of a round nylon bobbin 32 which supports the winding 23. The plates may be secured by any suitable means such as by spot welding or by a nut and bolt arrangement. The winding 23 is wound about the bobbin and in the preferred embodiment consists of 50 gage wire with 15,000 turns about the bobbin to provide, approximately, a 5,000 ohm winding. The cross sectional area of the leg of the stator core as it passes through the bobbin 32 is preferably of a square configuration as this provides a more efficient coupling relative to the winding 23. In other areas of the stator core outside of the winding, the core need be no thicker than thickness of the rotor plus a proper allowance for flux leakage.

As shown in FIG. 8(a) there is relatively little space between the winding and the stator core as the latter passes around the outside of the winding. By so constructing the stator, the length of the magnetic path through the stator is minimized thereby reducing iron losses. The portion of the stator core passing outside the energizing coil 23 is separated to form a permanent air gap in the magnetic circuit. The air gap includes a generally circular opening which accommodates the rotor and includes channel portions 23 and 24. As shown the locking tooth 33 of the rotor extends into channel 23 and cooperates with the pole faces 22 and 24 of the core to restrain movement of the rotor beyond a given point in either rotational direction. The periphery of the circular portion of the opening is notched to provide stator poles 26 on one side of the opening and stator poles 28 on the other side. The adjacent poles are spaced approximately 40° apart, center-to-center, which corresponds with the displacement of the teeth on each of the discs 29 and 31.

As shown in FIG. 8(a), the rotor is in a counterclockwise position with no power on the rotor dormant. The stator pole faces 26 are positioned symmetrically opposite poles faces 28. In addition, the teeth of the north rotor disc 29 are biased counterclockwise by 2°. In a similar matter the teeth on the south pole disc 29 are biased 2° clockwise.

Each stator tooth has an arc length of 15° and each stator slot has an arc length of 25°. This design provides a slot-to-tooth ratio of 5 to 3 which ratio provides for an optimum to and fro actuation of the rotor when the coil is energized with pulses of opposite polarity.

The locking tooth 33 which is a south pole is magnetically attracted to the stator pole face 24 due to the residual magnetism of the flux in the magnetic circuit comprised of the stator core 21, the air gap between the stator and rotor, the north pole rotor teeth of disc 31, the permanent magnet 99, and the south pole disc 29 to complete the residual magnetic holding circuit. The magnitude of this residual holding force is controlled by varying the thickness of the non-magnetic pin on the two faces of the locking tooth 33. As aforementioned, it has been found that a thickness of 0.003 inches provides for an optimum desired holding force. It is not intended, however, that this invention be limited by a pin thickness of 0.003 inches, and further it should be understood that a desired air gap could be obtained by other means such as by mechanical stops affixed to the rotor or to the pallet arm 37.

Refer now to FIG. 8(b) where the rotor is shown in its clockwise position with no power on and the rotor dormant. The stator pole faces 26 and 28 are shown positioned opposite each other. The teeth of the north pole rotor disc 29 are now biased counter-clockwise by 2°, and in the same manner, the teeth of the rotor south pole disc 29 are biased 2° counter-clockwise. The south pole locking tooth 33 is now magnetically attracted to the stator pole face 22 due to the residual magnetism of the flux passing through the magnetic circuit comprised of the stator core 21, the air gap between the rotor and stator, the north pole rotor teeth of disc 31, the permanent magnet 99, and the south pole rotor teeth of disc 21 to complete the magnetic holding circuit. As illustrated in both drawings, the axle or spindle 35 which supports the rotor has mounted thereon an arm 37 to the ends of which are fixidly attached a pair of pallet jewels 40. As the rotor oscillates to and fro, the pallets engage the teeth of escapement wheel 41 to step the escapement wheel at a rate of one revolution per minute.

Referring back to FIG. 8(a) a brief discussion of the rotor in operation will be presented with the initial assumption that the rotor is in the counter-clockwise position and the energizing pulse in the coil 23 is positive. The generated flux passes through the stator pole faces 26, across the air gap separating the north pole rotor disc 29 and the stator poles 26, through the north pole rotor teeth 93, through the permanent magnet 99, through the south magnetic poles of disc 31 to the stator poles 28 and back to core 21. Assuming that the positive energizing pulse causes a north pole at the stator poles 26 and correspondingly a south pole at the stator pole faces 28, the south magnetic poles of the rotor are attracted to the north magnetic poles of the stator and the north magnetic poles are repulsed away from the north magnetic poles of the stator thereby causing the rotor to move from its counter-clockwise position to a clockwise position. In addition, the south magnetic pole of locking tooth 33 is repulsed away from pole face 24 and is attracted to the pole face 22. Once rotation of the magnet to the clockwise position is completed, the locking tooth 33 of the rotor is held firmly in place against pole face 22 without contact bounce due to the residual magnetic forces that remain in the stator core 21 after the energizing pulse has been removed.

Refer now to FIG. 8(b) where the rotor is shown in clockwise position and wherein a negative energizing pulse is coupled to the winding 23. The flux passes through the stator pole faces 28, the north poles of the rotor disc 29, the permanent magnet 99, the poles of the south pole rotor 31, and back to the core 21. Hence, a north pole appears at the stator poles 28 and a south pole appears at stator poles 26.

Accordingly, the north magnetic poles of the rotor disc 29 are repulsed away from the north magnetic poles 28 of the stator core and the south magnetic poles of the rotor disc 31 are attracted to these stator poles thereby causing the rotor to rotate in a counter-clockwise direction. In addition, the south magnetic pole of the locking tooth 33 is repulsed away from stator pole face 22 and attracted toward stator pole face 24 which now has a north magnetic pole polarity. As aforementioned the residual magnetic flux in the stator locks tooth 33 against pole face 24 without contact bounce.

Figure 9:
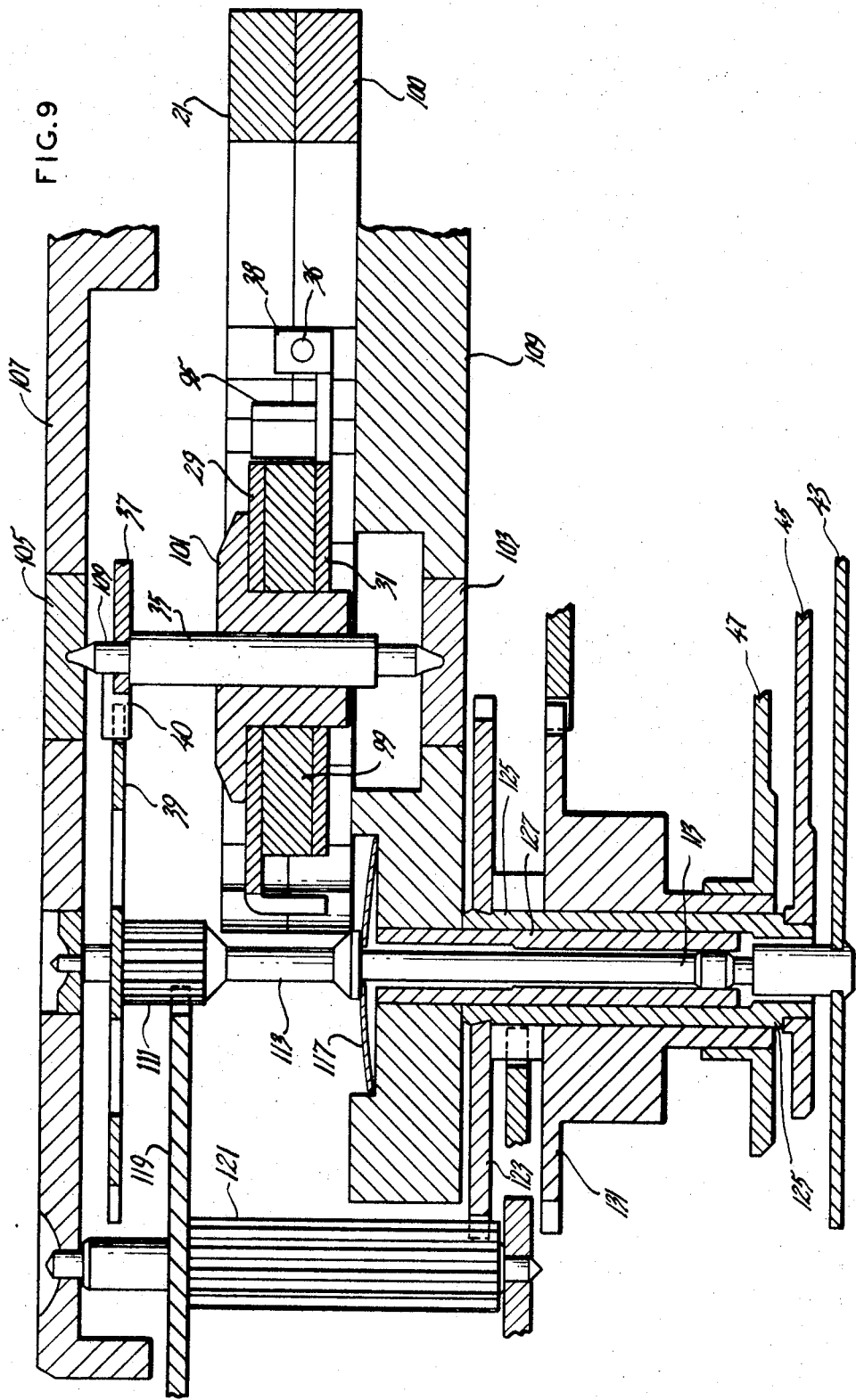
FIG. 9 is a section view of the stepper motor of this invention positioned in a timepiece.

Refer now to FIG. 9 which is a partial illustration of the stepper motor of this invention in a watch movement. The stator core 21 is shown positioned about the rotor discs 29 and 31 with the permanent magent 99 sandwiched therebetween. The locking tooth 33 is shown extending toward the coil carrying leg 100 of the stator 21. A bushing 101 which is fixidly secured to the rotor is press fitted onto spindle 35. Spindle 35 is journaled to each end in a set of jewels 103 and 105 for relatively frictionless rotation with respect to a rear mounting bridge 107 and a front plate 109. Pallet arm 37 is fixidly secured to the neck portion 109 of the spindle and has a pair of pallet jewels secured at the respective ends thereof for driving seconds wheel 41. Formed integrally with seconds wheel 41 is a pinion 111 and a seconds shaft 113. Mounted at the end of the seconds shaft 113 is a seconds hand 43. A light friction spring 117 is positioned in a slot in the front plate 109 and holds the seconds wheel in position while the movement of the rotor spindle and corresponding pallet arm steps seconds wheel 41. A stepdown gear wheel 119 is shown having gear teeth about the periphery thereof which mesh with the pinion 111. Integrally formed with the stepdown wheel 119 is a pinion 121 which drives a minutes wheel 123. Minutes wheel 123 in turn drives a cylindrical shaft 125 which is telescoped over the bearing 127 in which the seconds shaft rotates. The shaft 125 is terminated in a minutes hand 45. Movement of stepdown gear 119 also drives an hour wheel 131 which is telescoped over the minutes shaft 125 and which is terminated in an hour hand 47. The aforementioned watch movement structure is not shown in great detail since the movement is typical of such movements known in the art and is illustrated herein only to show how the stepper motor assembly of this invention is positioned in a watch case.

The foregoing invention presents a substantial advance in the timepiece technology because of a reduction in the amount of electrical energy required to drive the watch over an extended period of time. This reduction in energy results from the use of an intermittent electric pulse having a relatively low duty cycle on the order of 30 milliseconds of applied energy every second. It has been found that the step drive of the pallet arm for rotating the seconds wheel is accomplished in approximately 15 milliseconds so that it can be appreciated that the 30 milliseconds of applied electrical energy provides ample time for the pallet jewels to step the seconds wheel. Further, of significant importance is the fact that shock from an external source does not effect the timing accuracy of the watch of this invention. Thus, for example, assuming that the rotor is in the counter-clockwise position illustrated in FIG. 8(a) and is not yet due to be returned to the clockwise position shown in FIG. 8(b), if a sudden shock jars the rotor into the clockwise position, the watch will not gain a second in time since the next succeding pulse coupled to the winding 23 will merely reinforce retention of the rotor in the clockwise position. Hence, external jarring of the watch will not effect adversely the time keeping accuracy of the watch movement of this invention. Further, the reliability of the watch movement is enhanced because of the coil controlled oscillator drive which is highly stable and because of the digital form of the drive signal to the winding coil 23. Hence variations in the supply voltage to the oscillator circuit and to the drive circuits coupled to the winding 23 do not affect the time keeping integrity of the movement whereas in a conventional watch movement having a motor with a continuous unidirectional rotary movement changes in an input power level might result in inaccurate time keeping.

In addition, it should be pointed out that the number of teeth in the rotor disc 29 and 31 may be suitably varied. Thus, for example, it might be desirable to have fewer rotor teeth so that the rotor is not accidentially attracted in the wrong direction due to overlap of flux linkages from the stator and rotor poles.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. A battery operated stepper motor comprising in combination,
    a stator having a core and an energizing winding, said core being separated to form a generally circular air gap, the periphery of said air gap being notched to form a plurality of stator pole faces,
    a rotor including a pair of spaced rotor discs, each disc having a plurality of teeth spaced about the periphery thereof to form a plurality of rotor pole faces, said rotor further including a permanent magnet positioned between and secured to said rotor discs,
    means for limiting the rotational movement of said rotor to a predetermined arc length,
    a quartz crystal oscillator,
    means for dividing the frequency of the output of said oscillator, digital means for substantially reducing the duty cycle of the output of said dividing means, and
    drive means for coupling the output of said duty cycle reducing means to said stator winding to thereby generate an alternating flux field in said stator core, said alternating flux field driving said rotor with a to and fro oscillatory motion.

2. The battery operated stepper motor of claim 1 wherein said separated stator core defines at least one channel extending radially with respect to said air gap, and wherein said means for limiting the rotational movement of said rotor comprises an elongated tooth formed integral with one of said rotor discs, said tooth extending into said channel defined by said stator core so that rotational movement of said rotor is limited by said tooth making contact with the portions of said stator which define said channel.

3. The battery powered stepper motor of claim 2 wherein said elongated rotor tooth further comprises a pair of side portions proximate the end of said tooth, said side portions forming a pair of rotor pole faces, and a spacer element mounted on each side portion to prevent said rotor pole faces on said elongated tooth from contacting the portions of said stator core defining said channel.

4. The battery powered stepper motor of claim 3 wherein said rotor pole faces are biased with respect to said stator pole faces such that when said elongated tooth is in a first contact position with respect to the stator, the rotor is biased to rotate said elongated tooth to the other contact position.

5. The battery powered stepper motor of claim 4 wherein said dividing means comprises a plurality of cascaded divider stages, each divider stage having a pair of complementary output terminals, and wherein said means for reducing the duty cycle of the output of said dividing means comprises a pair of bistable circuits for receiving the complementary outputs of the last divider stage of said dividing means, said bistable circuits each being reset by the output of an intermediate divider stage of said dividing means.

6. In an electronic watch movement including a seconds hand, a minutes hand, and an hour hand and gearing means for coupling rotational movement to said hands, the improvement comprising in combination a battery operated stepper motor, a stator having a core and an energizing winding, said core being separated to form a generally circular air gap, the periphery of said air gap being notched to form a plurality of stator pole faces,
    a rotor including a pair of spaced rotor discs, each disc having a plurality of teeth spaced about the periphery thereof to form a plurality of rotor pole faces, said rotor further including a permanent magnet positioned between and secured to said rotor discs,
    means for limiting the rotational movement of said rotor to a predetermined arc length,
    a quartz crystal oscillator,
    means for dividing the frequency of the output of said oscillator, digital means for substantially reducing the duty cycle of the output of said dividing means, and
    drive means for coupling the output of said duty cycle reducing means to said stator winding to thereby generate an alternating flux field in said stator core, said alternating flux field driving said rotor with a to and fro oscillatory motion.

* * * * *